Feb. 2, 1965  F. C. ASHLEMAN  3,167,966
INSTRUMENT DAMPER
Filed Sept. 14, 1962  4 Sheets-Sheet 1

INVENTOR.
FRANCIS C. ASHLEMAN
BY Barnes + Seed

Feb. 2, 1965  F. C. ASHLEMAN  3,167,966
INSTRUMENT DAMPER
Filed Sept. 14, 1962  4 Sheets-Sheet 2

INVENTOR.
FRANCIS C. ASHLEMAN
BY Barnes + Seed

INVENTOR.
FRANCIS C. ASHLEMAN
BY Barnes + Seed

Feb. 2, 1965  F. C. ASHLEMAN  3,167,966
INSTRUMENT DAMPER
Filed Sept. 14, 1962  4 Sheets-Sheet 4

INVENTOR.
FRANCIS C. ASHLEMAN
BY Barnes + Seed

United States Patent Office 3,167,966
Patented Feb. 2, 1965

3,167,966
INSTRUMENT DAMPER
Francis C. Ashleman, Seattle, Wash., assignor to The Boeing Company, Seattle, Wash., a corporation of Delaware
Filed Sept. 14, 1962, Ser. No. 223,608
8 Claims. (Cl. 73—497)

My invention relates to an instrument damper, and more particularly to that type of damper which is especially adapted to be used in highly sensitive instruments such as accelerometers and rate gyros.

Rate gyros and angular and linear accelerometers have in modern aircraft and missiles a number of uses which require extreme sensitivity under widely varying conditions. Among these are applications in automatic pilots, guidance systems and target seekers for missiles, etc. The temperature conditions under which such instruments must operate vary from the range of temperature experienced near seal level to the rather extreme cold of the upper or supra-atmosphere, and even, in some cases, to the rather high temperature conditions created by travel through the earth's atmosphere at mach numbers considerably greater than the speed of sound. One of the most difficult problems in designing such instruments which will respond with any great degree of accuracy under such wide temperature variations is that of maintaining the damping or drag forces in the instrument independent of temperature.

Damping means are generally required in most instruments since the principle of operation is to measure a force created by the quantity to be ascertained, by a method of resisting this force through a spring mechanism and measuring in some way the spring's displacement or distortion, which is, of course, proportional to this force. ("Spring mechanism" is used herein to refer broadly to a restoring force in which the stress is equal to the strain.) In an accelerometer, for example, a spring mass system is utilized. Any acceleration of the instrument creates an interial force on the mass opposite in direction to that of the acceleration. The resulting displacement of the mass is opposed by the spring and is thus proportional to the accelerating force and consequently proportional also to the rate of acceleration. Accelerometers can be of two types, one measuring linear accelerations, and the other measuring angular accelerations.

When any such accelerating force is applied to the spring mass system, the mass will move to the equilibrium point where the force exerted by the spring balances the accelerating force, but the inertia of the mass will cause it to overshoot such equilibrium point. Unless there is some damping force, the mass will simply continue to oscillate about the equilibrium point so as to make the measurement of mass displacement quite difficult. Of course, there is hysteresis loss in the flexing of the spring and some frictional losses within the instrument, either of which would eventually stop the oscillations, but for any sort of proper response in the instrument, the oscillations should be substantially eliminated after only a few cycles so that the mass then comes to rest at a position of equilibrium.

Damping becomes especially critical when the accelerometer is used where there is vibratory or reciprocating motion. If the frequency of this motion is at any time near the natural frequency of the spring mass system, unless there is sufficient damping, the amplitude of the oscillations can increase to such an extreme that not only is it impossible to get any proper response from the instrument, but the instrument itself can become damaged. thus it is important that there be in the instrument a damping force which is uniform in the sense that it is always the same porportional value of the velocity imparted to the mass.

These same problems exist with rate gyros. Rate gyros have a function somewhat similar to angular accelerometers, except that the rate gyro directly measures angular velocity rather than angular acceleration. (Angular velocity, of course, can be determined from an angular accelerometer simply by integrating the total angular acceleration during any period of time, the quantity arrived at by such integration being equal to the value of angular velocity created by such acceleration.) The operation of a rate gyro is based upon the principle that if a gyroscope is rotated about an axis perpendicular to the axis about which the gyroscope is spinning, a moment will be exerted on the gyroscope about a third axis, perpendicular to both the spin axis of the gyroscope and the axis of rotation. For a given gyroscope spinning at a constant speed, this moment will be proportional to the angular velocity about the axis of rotation. A spring is used to resist the angular displacement of the gyroscope about this third axis, and hence the angular displacement of the gyroscope is proportional to the angular velocity.

Since the gimbal unit, of which the gyroscope is a part, has a certain amount of mass and is restrained by a spring, there is in effect a spring mass system, and any angular displacement of this unit creates inertial forces which carry the unit beyond its equilibrium position. Without damping, the gimbal unit will continue to oscillate about its equilibrium position. Also, as in the case of the accelerometer, if the rate gyro is used to measure velocities where there is reciprocating or vibratory motion, and such motion has a frequency near the natural frequency of the spring mass system of the rate gyro, then here too the amplitude of the oscillations can become extreme.

It is common in the prior art to dampen the oscillations of the inertial mass of an accelerometer or of the gimbal unit of a rate gyro with reference to a portion of the instrument, usually the instrument case, by means of the force created by the viscous drag of a damping fluid. This is accomplished in one way simply by immersing the inertial mass or gimbal unit in a damping fluid, or immersing the mass or unit in a fluid with the instrument case in close proximity with the mass or gimbal unit. In the latter arrangement movement of the mass or gimbal unit causes the fluid to flow by a restricted passage formed between the instrument case and the mass or gimbal unit so as to impede such movement and thus damp out the oscillations. Another method is so place a surface of such mass or gimbal unit, called a "drag surface" in close proximity to a drag surface of a stationary member, the two surfaces being arranged with respect to one another so that the distance therebetween remains substantially constant during the movement of the gimbal unit or the inertial mass. The space between these drag surfaces is filled with a damping fluid in a manner that relative movement between the two surfaces causes a shearing action in the fluid layers between the surfaces, the fluid resistance to this shearing action creating the desired drag force.

However as the temperature of the damping fluid varies as a result of temperature changes in the environment of the instrument, the viscosity of the fluid will also vary (e.g. for some damping fluids, the viscosity will double for a drop of 70° F.). Thus regardless of the particular method of damping used, unless there is some manner of compensating for these variations in viscosity, the viscous drag (i.e. damping force) for any given mass or gimbal displacement will vary for different temperatures so that the accuracy response of the instrument will be degraded when such temperature variations do occur.

The prior art provides several ways of compensating for such changes in viscosity which result from changes in temperature. One, for example, is to place bi-metal tabs in a flow passage or in the space between two drag surfaces, and so arrange these tabs that as the temperature increases, the tabs project further into the passageway or the shear space to impede any fluid movement therethrough or, in the latter arrangement, to produce the effect of bringing the two drag surfaces closer together. Another method is to cause a stationary surface to move closer to the surface of the mass or gimbal unit in response to an increase in temperature. The purpose of this is that as the fluid becomes less viscous, by placing the two surfaces in closer proximity, the sheering action or the rate of fluid flow therebetween will be greater for any given movement between the damping surfaces to compensate for the lowering of fluid resistance to such shear or such flow.

The difficulties with such prior art methods are several. One is that the coefficient of viscosity of most fluids is not constant but varies with temperature according to some exponential function. It is not always possible to select a mechanism which will compensate accordingly. Also, where proximate drag surfaces are used to create a sheer action, the distance between the two drag surfaces is relatively small (i.e. generally about a tenth of an inch or less). To vary this distance or to project metal tabs into this very small space so as to compensate with any great degree of accuracy for the viscosity changes over any appreciable temperature range requires the temperature-responsive compensating movements of the instrument to be within extremely close tolerances. Even then, these prior art compensating means simply will not function reliably except within rather moderate temperature ranges. This limitation of the prior art damping devices has necessitated, in some cases, controlling the ambient temperature of the instrument, where the environments in which the instrument must operate have wide temperature variations.

Another problem is that the manner in which the viscosity changes is not always solely dependent on temperature. For example, if some fluids are maintained at a relatively high temperature, such fluids will break down over a period of time, and the viscosity will change simply as a function of time with the temperature remaining constant.

It was in view of these problems that apparatus of the present invention was devised, the principle object of which is to provide an instrument damper which will produce an accurately predetermined damping force under widely varying environmental conditions.

It is a more particular object to provide an instrument damper in which the damping force may be maintained at a substantially constant level over wide variations of temperature of the damping fluid which creates the damping force.

It is a further object to provide an instrument damper which admits of being arranged so that the damping force will be substantially constant regardless of the fact that the coefficient of viscosity itself of the damping fluid varies with temperature.

It is yet another object to provide an instrument damper which admits of being arranged so that the damping force may be maintained at a substantially constant level regardless of changes of viscosity which are not merely a direct function of temperature.

Other more particular objects and advantages of the invention will, with the foregoing, appear and be understood in the course of the following description and claims, the invention consisting in the novel construction and in the adaptation and combination of parts hereinafter described and claimed.

Figure 1:
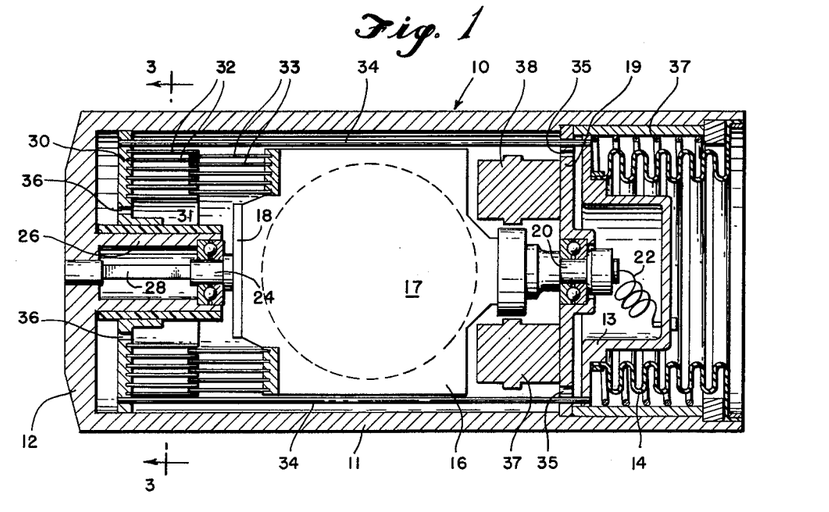
FIGURE 1 is a semi-schematic longitudinal sectional view of a rate gyro embodying preferred teachings of my invention, wherein the damping plates overlap only to a small extent, this being the condition of overlap which occurs under low temperature conditions.
Figure 2:
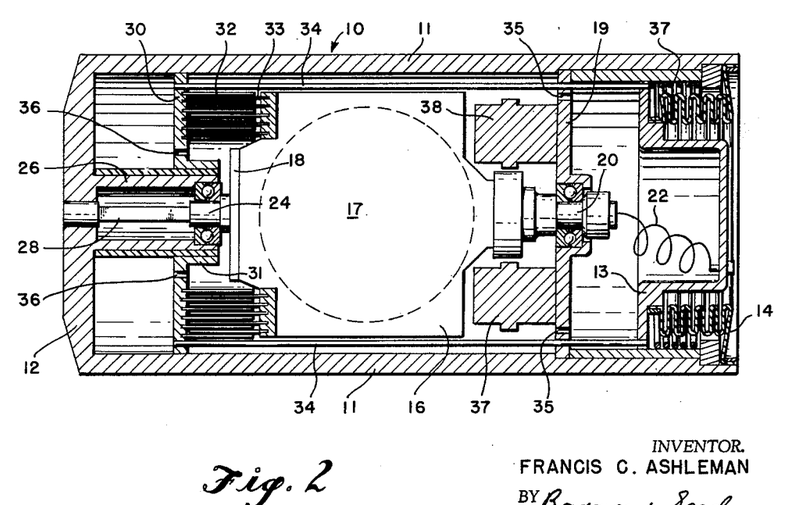
FIG. 2 is a view similar to that of FIGURE 1, wherein the area of overlap of the damping plates is quite large, this being the condition of overlap that occurs under rather high temperature conditions.
Figures 3, 4, 6:
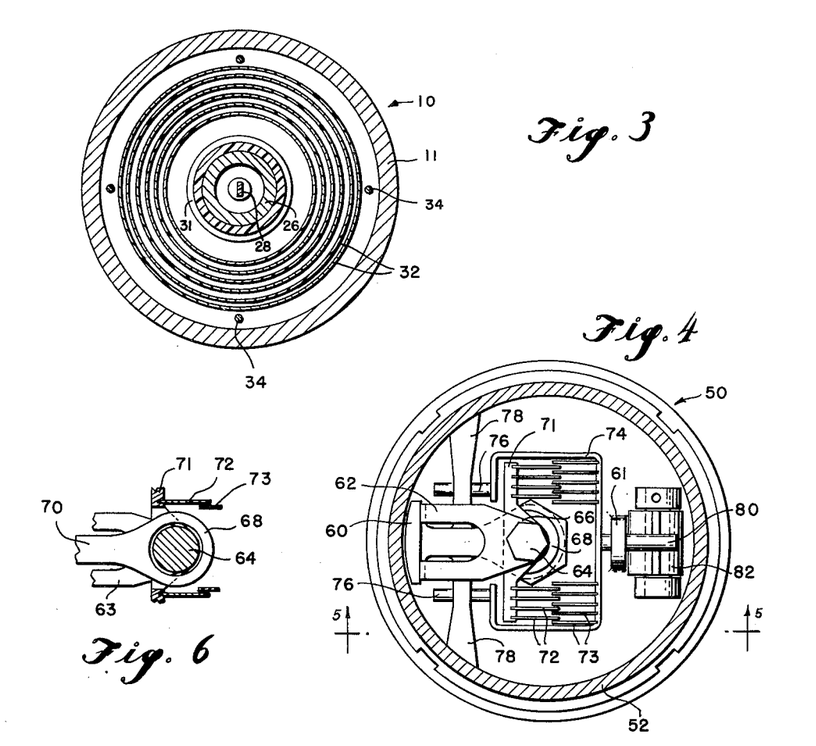
FIG. 3 is a transverse sectional view taken on line 3—3 of FIG. 1.
FIG. 4 is a horizontal sectional view of a linear accelerometer embodying preferred teachings of my invention.
FIG. 6 is a fragmentary horizontal sectional view taken on line 6—6 of FIG. 5.

A rate gyro embodying preferred teachings of my invention is shown in FIGURES 1, 2 and 3. Numeral 10 designates a sealed case comprising a side wall 11 of uniform cross-section closed at the front by a fixed end wall 12, and at the rear by a slide mounted end wall 13 located within the side wall 11 and forming a seal therewith by means of a bellows 14 which reaches circumferentially about the inside surface of the side wall. The closed cavity defined by the side wall 11, the fixed end wall 12, and the slide mounted end wall 13 (this cavity also including the space between the bellows 14 and the side wall 11) is filled with a suitable damping fluid.

Journal mounted within the case 10 is a gimbal unit 16, which contains a gyroscope, indicated schematically at 17. The gimbal wall 18 is properly sealed so as to prevent any of the damping fluid in the case 10 from coming in contact with the gyro.

To identify the reference axes of the instrument, the center axis of the case 10, i.e. the axis perpendicular to the end walls 12 and 13, will be designated the longitudinal axis, which is the axis about which the gimbal unit 16 rotates. The axis perpendicular to the longitudinal axis and lying in the plane on which FIGS. 1 and 2 are taken is called the transverse axis, which is the axis about which the entire instrument rotates, the rate of this rotation being the quantity which the instrument is designed to measure. The third axis, perpendicular to the longitudinal and transverse axes, is seen in FIGS. 1 and 2 as rising perpendicular from the plane of the paper upon which FIGS. 1 and 2 are shown, and is the axis about which the gyro 17 spins. This is termed the gyro axis. It should be noted that the term gimbal as used herein refers to a unit which rotates with respect to its mounting only along one axis, which, as shown herein, is the longitudinal axis of the instrument.

Rigidly mounted in the case 10 at a location behind the gimbal 16 is a stationary, transversely placed mounting plate 19 which provides a journal mounting for a rearwardly extending gudgeon 20 of the gimbal 16. The journal mounting is such that it prevents any movement of the gimbal along the longitudinal axis. Electric power is delivered to the motor (not shown) in the gimbal unit, which motor drives the gyro by means of leads 22 which reach from the end wall 13 to the gudgeon 20.

Extending forwardly from the gimbal 16 is a second gudgeon 24, by which the gimbal is journal mounted at the rear of a neck member 26 which is rigidly secured to, and extends rearwardly from, the end wall 12. To restrain the angular movement of the gimbal 16 about the longitudinal axis, there is provided a torsion spring 28 fixed at its rear end to the front gudgeon 24 and at its forward end to the case end wall 12.

A plate 30 is slide mounted by a sleeve portion 31 on the neck 26 so as to permit the longitudinal slide movement of the plate without any skewing thereof. Rigidly secured to the mounting plate 30 and extending rearwardly therefrom are a plurality of concentric non-rotating drag cups 32, with reference to which the damping action occurs. These cups are formed of moderately thin sheet material and are cylindrically shaped with the center axis of each cylinder coinciding with the longitudinal axis of the instrument, which is, as before stated, the axis about which the gimbal unit 16 is journal mounted.

Extending forwardly from, and rigidly attached to, the gimbal 16 so as to rotate therewith, are a plurality of drag cups 33, arranged to interfit with the non-rotating cups 32. That is to say each of the gimbal mounted cups 33 is so positioned that it is able to extend into the annular space defined by a related pair of proximate non-rotating cups 32. These cups 33 are likewise formed of moderately thin sheet material and are shaped as concentric cylinders with their common center axis coinciding with the longitudinal axis of the instrument.

The movable mounting plate 30 is attached to the movable end wall 13 by means of a plurality of connecting rods 34 located just within the side wall 11 of the case. The purpose of so connecting the end wall 13 to the slide mounted plate 30 will be described more fully hereinafter. However, for clarity of understanding, it should be here indicated that as the temperature of the fluid in the case increases, the end wall 13 is caused to move rearwardly so as to draw the plate 30 with its drag cups 32 nearer to the gimbal 16. Conversely, as the fluid in the case 10 becomes colder, the end wall 13 will be caused to move forward so as to move the mounting plate 30 with its drag cups 32 further from the gimbal 16. Thus the overlap of the drag cups 32 with the gimbal mounted drag cups 33 varies as a function of the temperature of the damping fluid in the case, this variation of overlap being the means by which the damping force is kept constant. This is illustrated in FIGS. 1 and 2, the former being the condition where fluid temperature is low and the area of overlap is quite small, and the latter being a condition where the fluid temperature is quite high and the area of overlap is nearly at a maximum. (It is to be understood, of course, that the relative dimensions of this instrument as shown herein are such that this change of overlap area may be somewhat exaggerated for purposes of clarity in illustration.) Vents are provided at 35 and 36 in the plates 19 and 30 to permit such slide movement, and a stiffening spring 37 mounted within the bellows acts to moderately press the plate 13 forward.

To determine the angular location of the gimbal 16 at any given time, there is provided a pair of spaced pick-offs 38 mounted on the forward face of the fixed mounting plate 19. Secured to the rear of the gimbal 16 and located between the pick-offs 38 are a pair of contact points (not shown) by which the pick-offs are able to determine the gimbal location. This locating means (i.e. the pick-offs 38 with the gimbal contacts) could be any one of a number of standard prior art devices. (For example, the pick-offs could be magnets and could sense the location of the pick-off points by means of the change of flux. Or the pick-offs could be potentiometers which sense the change of location by sensing the change of resistance.)

In operation, the gyro 17 is caused to rotate at a constant speed. Any angular movement of the instrument about its transverse axis will create a moment about an axis at right angles to the axis about which the gyro spins (i.e. the gyro axis) and at right angles to the axis (i.e. the transverse axis) about which the instrument is rotated. Thus this moment acts about the longitudinal axis of the instrument on which the gimbal is journal mounted, so as to cause the gimbal to rotate against the restraining force of the torsion spring 28. This moment about the longitudinal axis is proportional to the angular rate of travel about the transverse axis, and hence the displacement of the gimbal about the longitudinal axis will be proportional to the angular speed about the transverse axis. It is this displacing movement of the gimbal unit which causes the oscillations thereof that must be damped.

Since the entire gimbal unit 16 is immersed in the damping fluid, there is a certain amount of damping effect caused by the action of the fluid on the gimbal surface. But by far the greatest amount of damping force is created by the viscous drag of the overlapping surfaces of the two sets of drag cups 32 and 33. The distance from the surface of one cup 32 to the facing surface of a proximate cup 33 is about a tenth of an inch or less. Hence any relative movement between these two surfaces causes a shearing action in the damping fluid located therebetween, with the fluid resistance to this shearing action serving to dampen any oscillations of the gimbal unit. Since, as previously stated, the cups are all concentric, as their area of overlap varies with the temperature of the damping fluid in the aforedescribed manner, the perpendicular distance from a surface of one of the gimbal mounted drag cups 33 to the proximate surface of a non-rotating drag cup 32 remains constant. Thus the drag between the rotating and non-rotating cups is directly proportional to the area of overlap (this area of overlap or "drag area" being that total surface area of the cups 33 which is in facing relationship to the proximate surfaces of the cups 32), and also is directly proportional to the viscosity of the damping fluid which permeates the drag cups so as to fill the gap between any pair of proximate drag surfaces. As the temperature of the damping fluid increases so as to cause a corresponding decrease in the viscosity of the damping fluid, the volume of the damping fluid increases so as to move the slide mounted end wall 13 rearwardly and cause the non-rotating drag cups 32 to also move rearwardly to increase the area of overlap with the drag cups 33. Similarly, a lowering of fluid temperature will cause a decrease in fluid volume and a reduction of drag area. Thus, by selecting a proper damping fluid, and forming the case 10 and arranging the drag cups in accordance with the coefficient of viscosity and the coefficient of thermal expansion of the fluid, so that a change of volume of the fluid will cause a change in the overlap area of the damping plates which is inversely proportional to the change in fluid viscosity, it is possible to keep the damping force exerted on the gimbal 16 substantially constant over a wide range of temperature variations.

It should be indicated that the rate gyro shown in FIGURES 1, 2 and 3 may be modified in a manner to operate as an angular accelerometer by substituting an inertial mass for the gimbal unit 16, without detracting from the proper operation of the damping means of my invention. (This modification could be accomplished simply by stopping the gyroscope 17 from spinning, in which case the gimbal unit 16 of which the gyroscope 17 is, of course, a part, would act as an inertial mass.) However, the angular acceleration which the instrument would measure would be about the longitudinal axis of the instrument rather than the transverse axis. Thus, as the instrument is accelerated angularly about the longitudinal axis, the angular displacement of the inertial mass (i.e. the gimbal unit 16 with the gyroscope 17 not rotating, or some inertial mass which is substituted therefor) would be proportional to the rate of angular acceleration, these angular accelerations causing the oscillations which must be damped. When this instrument is so used as an angular accelerometer, the function and operation of the damping cups 32 and 33 are substantially the same as when the instrument is used as a rate gyro.

Also this same instrument (the instrument shown in FIGS. 1, 2 and 3) may be modified slightly to serve as a linear accelerometer, and still embody teachings of my invention. This would be accomplished by substituting an inertial mass for the gimbal unit 16, and so arranging this inertial mass that its center of gravity is spaced a predetermined distance from the longitudinal axis of the instrument (which is, as hereinbefore described, the axis about which the gimbal 16, or the inertial mass substituted therefore, is journal mounted). The axis then along which the linear accelerations would be measured is an axis perpendicular to the longitudinal axis of the instrument and perpendicular to a line drawn from the center of gravity of the inertial mass to the longitudinal axis of the instrument. Any linear acceleration along this last-described axis would create a moment which would act on the inertial mass in a manner to rotate this mass about the longitudinal axis of the instrument. The torsion spring 28 would resist such rotational movement of the inertial mass, and thus the angular displacement of the inertial mass would be proportional to the rate of linear acceleration. If this instrument were to be so used as a linear accelerometer, the torsion spring 28 should be sufficiently stiff in relation to the acceleration being measured so that the angular displacement of the inertial mass would never become too large. As in the circumstance where the same instrument is used as an angular accelerometer, the function and operation of the cups 32 and 33 would remain substantially the same.

Figure 5:
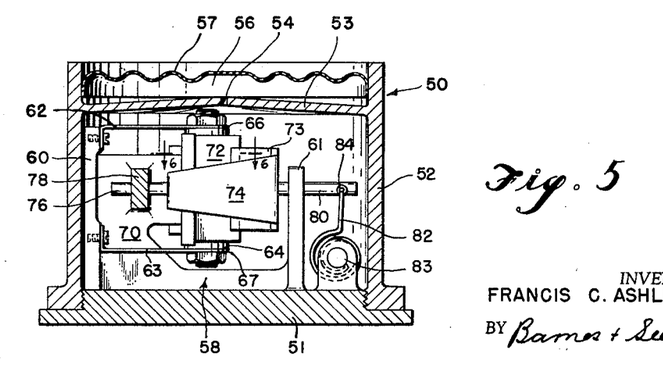
FIG. 5 is a longitudinal sectional view of the linear accelerometer of FIG. 4.

Referring now to FIGS. 4, 5, and 6, there is shown another type of linear accelerometer which also utilizes a damping means embodying teachings of my invention. Numeral 50 designates the instrument case, comprising a floor 51, a side wall 52, and a cover 53. Formed in the cover 53 is an orifice 54 leading to an expansion chamber 56, which is defined by the cover 53 and a flexible diaphragm 57. The purpose of this chamber 56 is to allow for the thermal expansion of the damping fluid which entirely fills the case 50 as well as the chamber 56.

Mounted within the instrument case 50, and rigidly secured thereto, is a mounting frame 58, comprising a forward and a rear upstanding post, designated 60 and 61 respectively. An upper and a lower pair of horizontal leaf springs 62 and 63 are fixedly secured each by its forward portion to the post 60, and function to provide a spring mounting for the inertial mass 64 which is rigidly secured to each of the rear portions 66 and 67 of the springs 62 and 63 and extends vertically therebetween.

A pick-off coil 68 is mounted rigidly with respect to the case 50 by means of a mounting bar 70 which extends rearwardly from the forward post 60. The coil extends circumferentially about the middle portion of the inertial mass 64, which is properly provided with pick-off points (not shown) by which the coil 68 senses the vertical position of the mass 64.

Rigidly attached to the upper and lower end of the inertial mass 64 is a frame member 71 which extends along each side of the inertial mass and the pick-off coil 68. On each side of the inertial mass 64 is a set of planar vertically positioned damping plates each set of which is rigidly secured to the frame 71.

To provide a proper mounting for two sets of stationary damping plates 73 (stationary in the sense that these plates do not oscillate with the inertial mass), which interfit with the plates 72, there is a generally U-shaped frame 74 which is mounted for longitudinal slide motion within the case 50. At the forward end of this frame 74 are two forwardly extending studs 76 which are slide mounted in struts 78 secured to the case 50. A third stud 80 extends rearwardly from the frame 74 and finds a slide mounting in the aforementioned rear post 61. One end of a bimetal element 82 is rigidly attached at 83 to the instrument case 50, and is secured by its other end at 84 to the rear end of the stud 80.

The plates 72 which move vertically with the inertial mass 64 and the non-vertically moving plates 73 are planar, with each plate lying in a respective vertical longitudinal plane. Each of the plates 72 extend rearwardly between a proximate pair of plates 73, so that there is an area of overlap between the plates 72 and 73, this area of overlap being the damping area of the plates.

The axis along which the linear accelerations are measured is the vertical axis of the instrument. Any acceleration along this vertical axis creates an inertial force on the mass 64 opposite in direction to that of the acceleration, which inertial force, because of the spring mounting of the mass 64, causes the mass to be displaced a distance which is proportional to the accelerating force.

The damping plates 72 and 73 function in generally the same manner as the damping plate (i.e. drag cups) 32 and 33 of the instrument shown in FIGS. 1–3. That is to say that since the damping fluid completely fills the case 50, and therefore fills the gaps where the plates 72 and 73 overlap, any relative movement between the plates 72 and 73 causes a shearing action in the damping fluid in this area of overlap. When the instrument enters into a warmer environment, so that the temperature of the damping fluid is raised in a manner to lower the viscosity thereof, the bimetal element 82, because of this change in temperature, causes the horseshoe frame 74 to slide forward in its mounting, so as to increase the area of overlap between the plates 72 and 73. By properly selecting and arranging the bimetal element in the case 50, the area of overlap of the plates 72 and 73 is caused to increase proportionately to the decrease in the coefficient of viscosity of the damping fluid. Thus the damping force exerted on the plates 72 and hence on the inertial mass 64 is maintained at a constant level (i.e. is the same proportional value of the velocity imparted to the mass).

Figure 7:
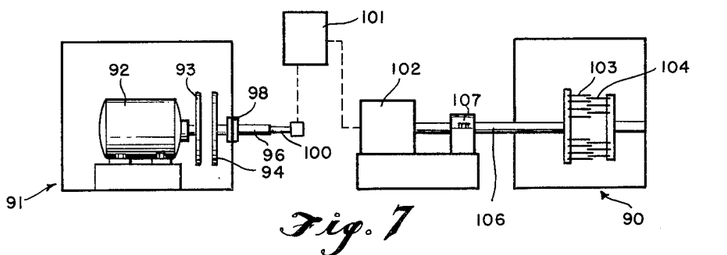
FIG. 7 is a schematic drawing of another embodiment of my invention.

Another embodiment of my invention is illustrated in FIG. 7 which indicates only schematically an accelerometer designated 90, whose function and operation is or may be the same as the accelerometer shown in FIGS. 4–6, with the exception that the bimetal element 82 is eliminated. Another mechanism, to be described hereinafter, is substituted therefor to vary the amount of overlap of the damping plates in response to the change of viscosity in the damping fluid. Since the instrument 90 is so similar to that shown in FIGS. 4–6, none of the operating parts of the accelerometer 90 is shown, but damping plates are indicated at 103 and 104 to show specifically that the same type of overlapping plates are used in this instrument as in the instrument of FIGS. 4–6, and are substantially identical in terms of structure and operation to the latter.

Numeral 91 designates a closed case which is completely filled with a damping fluid that is the same as that which is used in the instrument 90. Mounted within the case 91 is a motor 92 which causes a flat circular disc 93 to rotate about its center axis at a constant speed. Spaced a short distance to the rear of the disc 93 is a second disc 94, which is the same size as the disc 93 and is positioned parallel to, and on the same axis as, the disc 93. A shaft 96 extends rearwardly from the disc 94 along the axis thereof to find a journal mounting in the case 91. Stop collars 98 are provided on the shaft 96 to prevent longitudinal movement of the disc 94 so that the space between the discs 93 and 94 remains constant.

Any angular movement of the shaft 96 is yieldingly resisted by a spring mechanism, indicated schematically at 100. The spring 100 is operatively connected to a force sensing device 101, which in turn is operatively connected to a servo mechanism, shown schematically at 102, which acts to vary the area of overlap of the accelerometer damping plates 103 and 104. This is accomplished by moving longitudinally a shaft 106, that is slide mounted at 107, and secured to plates 103, to cause the two sets of plates 103 and 104 to move longitudinally with respect to each other.

In operation, the components 90 and 91 are placed in the same environment so that the damping fluids of each remain at substantially the same temperature and therefore have substantially the same viscosity characteristics. As the damping fluids become colder, the disc 93, rotating at a constant speed and being at the same predetermined distance from the disc 94, will exert a greater torque on the disc 94. This will register in the sensing mechanism 101, which in turn will transmit this information to the servo-mechanism 102, so that this mechanism will withdraw the shaft 106 to lessen the drag area of the plates 103 and 104 the desired amount. Conversely, as the temperature of the damping fluids rise, the force on the spring 100 that is sensed by the mechanism 101 will cause the servo-mechanism 102 to move the shaft 106 toward the plates 104 to increase the drag area of the plates 103 and 104, thus maintaining the damping force at a constant level.

Figure 8:
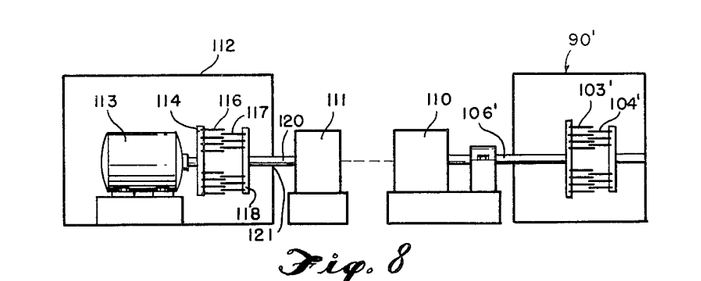
FIG. 8 is a schematic drawing of yet another embodiment thereof.

Yet another embodiment of my invention is schematically illustrated in FIG. 8, wherein there is an instrument 90′ which is identical in its arrangement and operation to the instrument 90 shown in FIG. 7. Operatively connected to the shaft 106′ of the instrument 90′ is a servo-mechanism 110 which serves to move the shaft 106′ to vary the overlap of the plates 103′ and 104′ in response to a sensing mechanism shown schematically at 111, which mechanism will be described hereinafter.

A case 112 contains a motor 113 which rotates a mounting plate 114 at a constant speed. Extending forwardly from the plate 114 are a plurality of concentric cylindrically shaped cups 116, which are similar in their construction to the drag cups 32 of the instrument shown in FIGS. 1-3. A second set of drag cups 117 are located to the rear of the cups 116 and interfit therewith. These cups 117 are secured to a plate 118 which in turn is rigidly secured to a shaft 120 which is slide mounted at 121 in the case 112, in a manner that the shaft 120 is able to move longitudinally but not able to rotate.

As the plates 116 rotate at a constant speed, through the medium of the damping fluid which fills the case 112, a torque is exerted on the plates 117 and consequently on the shaft 120. The aforementioned mechanism 111 senses the torque on the shaft 120 and operates to move this shaft either forward or rearwardly to maintain this torque at a constant level. As the mechanism 111 so acts to change the area of overlap of the cups 116 and 117, the mechanism 111 transmits this information in a suitable manner to the servo-mechanism 110, which then moves the shaft 106′ to vary the area of overlap of the cups 103′ and 104′ proportionately. Since the instrument 90′ and the case 112 are kept in substantially the same environment so that the temperature of the damping fluids of each are substantially the same, when the viscosity of the fluid in the case 112 changes so that the mechanism 111 varies the overlap of the plates 116 and 117 a certain amount, the servo-mechanism 110 acts to change the overlap of the plates 103′ and 104′ a proportionate amount. Thus the damping force of the plates 103′ and 104′ is maintained at a constant level.

As mentioned hereinbefore, it is not always possible to arrange the mechanism which varies the area of overlap of the damping plates so that the plates will move an increment of distance which is proportional to the change of viscosity in the fluid. As an example, referring now to the instrument shown in FIGS. 4-6, the end 84 of the bimetal element 82 can be arranged so that any increment of movement along the longitudinal axis of the instrument will be proportional to the increment of change in temperature of the damping fluid of the instrument. However, the change of viscosity of the damping fluid very often does not vary directly with temperature, but according to some exponential function.

Figure 9:
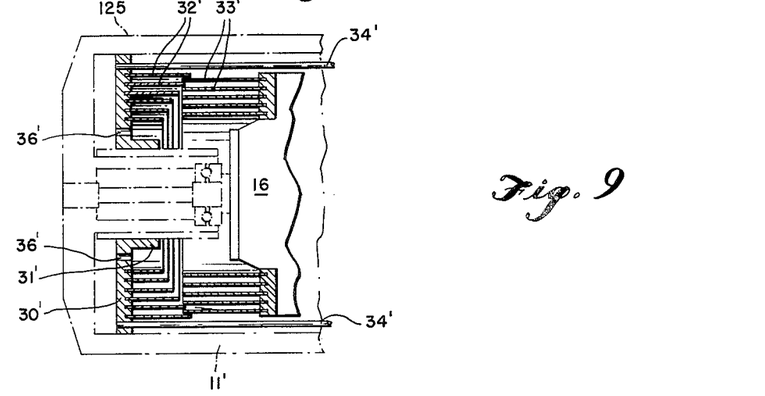
FIG. 9 is a fragmentary schematic view similar to that of FIG. 1, but showing a modified configuration of the damping plates thereof, which configuration embodies yet other teachings of my invention.

Because of this, I have provided the arrangement of damping plates illustrated in FIG. 9, wherein is shown a portion of an instrument 125, which is identical to the instrument shown in FIGS. 1-3, with the exception that the damping plates 32′ and 33′ of the instrument 125 are modified from the plates 32 and 33 shown in FIGS. 1-3. Thus the other working parts of the instrument of FIG. 9, which parts are identical to those in FIGS. 1-3, are shown merely in phantom. It will be seen that some of the plates 32′ extend rearwardly further than others, with the result that as the temperature of the damping fluid increases, so that the fluid expansion moves the damping plates 32′ rearwardly in a manner to increase the area of overlap, the outermost plates 32′ will first begin to interfit with their related pairs of the plates 33′. Further rearward movement of the plates 32′ will cause other of these plates also to begin to interfit with the related pairs of the plates 33′. Thus at higher temperatures, for each increment of rearward travel of the plates 32′ the increment of increase in the area of overlap will be greater than it would be for an equal increment of travel of the plates 32′ at a lower temperature. Thus by properly arranging the damping plates in a manner similar to that described above, the area of overlap can be made to vary inversely to the viscosity of the damping fluid so as to maintain the damping force created by the drag plates at a constant level.

Figure 10:
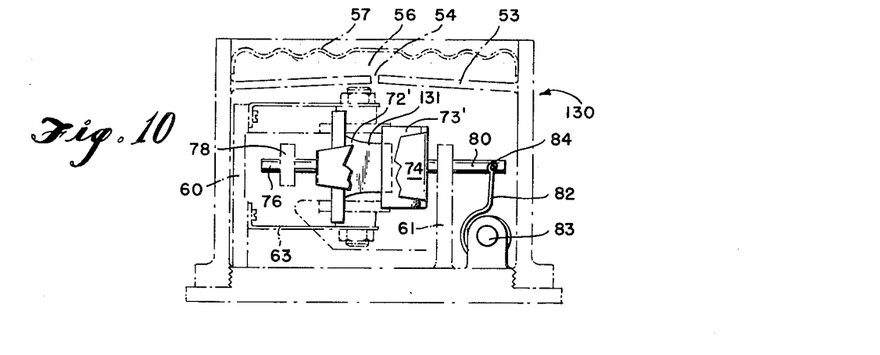
FIG. 10 is a schematic view similar to that of FIG. 5, showing a modified configuration of the damping plates thereof, so as to illustrate further preferred teachings of my invention.

Another facet of my invention is shown in FIG. 10 wherein is shown an instrument 130 which is identical to that shown in FIGS. 4-6, with the exception that the damping plates 72′ and 73′ are modified from the plates 72 and 73 of the instrument of FIGS. 4-6. The edge portion 131 of each of the plates 72′ is contoured according to the precise manner in which the viscosity of the damping fluid changes with temperature in relation to the manner in which the mechanism that varies the area of overlap of the damping plates operates in response to changes in temperature. With the particular configuration shown in FIG. 10, as the plates 72′ and 73′ begin to interfit, there is a relatively small area of overlap. But as the temperature rises, for each increment of forward travel of the plates 73, the increment of increase in the area of overlap becomes larger.

The contour line 131 of the damping plates 72′ may be arrived at experimentally. However, it is believed a clearer understanding will be attained by analyzing, with the aid of the graphs shown in FIGS. 11-14, the factors which determine the manner in which the plates 72′ should be contoured. These graphs do not necessarily correspond to any particular damping fluid or to any particular overlap varying mechanism, but are merely used by way of illustration.

Figure 11:
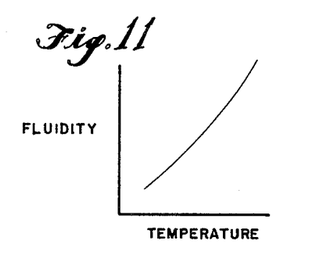
FIGS. 11–14 are illustrative graphs which show the manner in which the plate configuration of the apparatus of FIG. 10 is determined.

FIG. 11 is a graph in which the fluidity of the damping fluid (fluidity being the reciprocal of viscosity) is plotted against the temperature of the damping fluid. It can be seen from the graph that the fluidity of the damping fluid increases with temperature.

Figure 12:
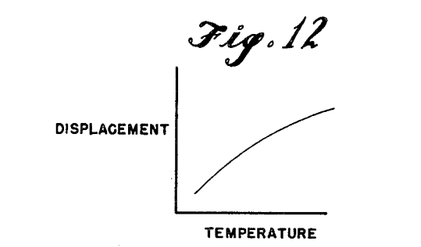

FIG. 12 is a graph in which the relative displacement of the plates along the longitudinal axis is plotted against temperature of the damping fluid. As before indicated, this function is arbitrarily selected merely for purposes of illustration and does not necessarily correspond to any particular mechanism which varies the area of overlap of the damping plates.

Figure 13:
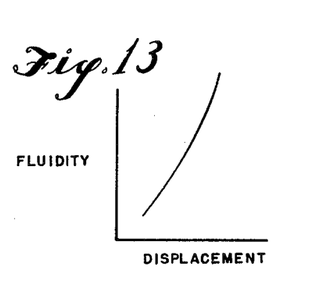

The graph of FIG. 13 plots fluidity against the displacement values of the graph of FIG. 12. The values according to which the curve of FIG. 13 is drawn may be calculated from the graphs of FIGS. 11 and 12. This is done by finding the values of fluidity and displacement for various temperature readings and plotting these values directly on the graph of FIG. 13.

Figure 14:
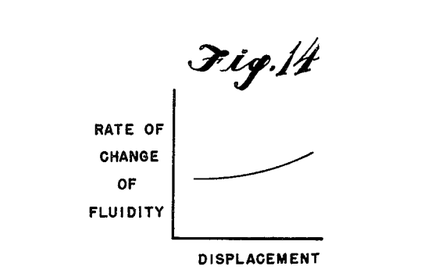

The values which form the curve of FIG. 14 are calculated directly from the graph of FIG. 13. This is accomplished by differentiating the curve of FIG. 13 to obtain the rate of change of fluidity. The rate of change of fluidity is then plotted against displacement in the graph of FIG. 14. The contour of the line of FIG. 14, with respect to the base line of the graph, corresponds to the contour line 131 of the plates 72 with respect to the longitudinal axis of the instrument.

It is believed that the invention will have been clearly understood from the foregoing detailed description of my now-preferred illustrated embodiments. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In an instrument wherein there is a member movable with respect to a reference portion of said instrument, said member being arranged to be displaced by a force to be measured, and there is means which exerts a restoring force which tends to resist said displacing force in a manner that said restoring force increases with the amount of said displacement, so that said movable member with said restoring means comprises a spring mass system in said instrument, the instrument being such that for the proper operation thereof, motion of said movable member must be damped with respect to said reference portion, an instrument damper comprising:
   (a) a first drag member which is secured to and movable with said movable member, said first drag member having a plurality of plates, each of which presents at least one drag surface, each portion of each drag surface being parallel to the direction of the displacing motion of said movable member,
   (b) a second drag member which is secured to, and stationary with respect to, the reference portion of said instrument, said second drag member having a plurality of plates which are arranged to interfit with said first-named plates so that each of said second-named plates presents a drag surface facing toward, and spaced a predetermined distance from, a related one of said first-named plates, the portions of said plates which so face each other being the drag area of said plates, said instrument being arranged to contain a damping fluid, and said drag members being disposed relative to one another to receive said damping fluid between said drag surfaces, the damping fluid acting to create a viscous drag between said first and second drag members and,
   (c) means to move said drag members relative to one another in a direction other than that of said displacing motion of said movable member, so as to vary the drag area of said drag members some of said plates of one drag member being so arranged that as said drag members are moved relative to one another so as to increase the drag area, some of said plates of one drag member begin to come into facing relationship with their related plates of the other drag member, said plates thus being so arranged that the change of drag area is inversely proportional to the change in viscosity of the damping fluid.

2. An accelerometer comprising:
   (a) an inertial mass mounted for rotary motion in said accelerometer,
   (b) spring means to resist said rotary motion,
   (c) pick-off means to sense the angular position of said inertial mass,
   (d) a first set of uniformly curved drag plates mounted on said inertial mass, with the center of curvature of each being concentric with the axis of rotation of said inertial mass and adapted to receive a damping fluid therein,
   (e) a second set of uniformly curved drag plates mounted in said accelerometer with the center of curvature of each being concentric with the rotary axis of said inertial mass, each of said second set of plates being arranged to interfit between a related two of said first set of drag plates to create an area of overlap, the area of overlap being the drag area of said sets, said second set of plates being so mounted that as said inertial mass rotates, there is relative motion between said two sets of plates to create a viscous drag betwen said two sets of plates, and
   (f) means to cause relative movement of said sets of plates along the axis of rotation so as to vary the area of interfit of said plates, said means being responsive to conditions which alter the viscosity of the damping fluid so that the change of the drag area is inversely proportional to the change in fluid viscosity so that the viscous drag is constant.

3. A rate gyro comprising:
   (a) a gyroscope unit comprising a gimbal and a gyroscope mounted thereon, said gimbal being mounted for rotary motion in said rate gyro,
   (b) spring means to resist said rotary motion,
   (c) pick-off means to sense the angular position of said gimbal,
   (d) a first set of uniformly curved drag plates mounted on said gimbal, with the center of curvature of each being concentric with the axis of rotation of said gimbal and adapted to receive a damping fluid therein,
   (e) a second set of uniformly curved drag plates mounted in said rate gyro with the center of curvature of each being concentric with the rotary axis of said gimbal each of said second set of plates being arranged to interfit between a related two of said first set of drag plates to create an area of overlap, the area of overlap being the drag area of said sets, said second set of plates being so mounted that as said gimbal rotates, there is relative motion between said sets of plates, and
   (f) means to cause relative movement of said sets of plates along the axis of rotation so as to vary the area of interfit of said plates, said means being responsive to conditions which alter the viscosity of the damping fluid so that the change of the drag area is inversely proportional to the change in fluid viscosity so that the viscous drag is constant.

4. An instrument comprising:
   (a) a member mounted for rotary motion in said instrument,
   (b) spring means to resist said rotary motion,
   (c) a first set of uniformly curved drag plates mounted on said member, with the center of curvature of each being concentric with the axis of rotation of said member and adapted to receive a damping fluid therein,
   (d) a second set of uniformly curved drag plates mounted in said instrument with the center of curvature of each being concentric with the rotary axis of said member, each of said second set of plates being arranged to interfit between a related two of said first set of drag plates to create an area of overlap, the area of overlap being the drag area of said sets, said second set of plates being so mounted that as said member rotates, there is relative motion between said two sets of plates to create a viscous drag between said two sets of plates, and
   (e) means to cause relative movement of said sets of plates along the axis of rotation so as to vary the area of interfit of said plates, said means being responsive to conditions which alter the viscosity of the damping fluid so that the change of the drag area is inversely proportional to the change in fluid viscosity so that the viscous drag is constant.

5. In an instrument, a damper for damping motion of a movable member with respect to a reference portion and comprising:
(a) a first drag member secured to and movable with said movable member and having a first drag surface,
(b) a second drag member secured to and stationary relative to said reference portion and having a second drag surface facing toward, and spaced a predetermined distance from, said first drag surface to form a first drag area,
(c) damping fluid in said first drag area to create a viscous drag between said drag members,
(d) a first servo member having a third drag surface,
(e) a second servo member having a fourth drag surface facing toward, and spaced a predetermined distance from, said third drag surface to form a second drag area,
(f) damping fluid in said second drag area,
(g) means for causing a predetermnied relative movement between said first and second servo members to create a drag force on said first servo member varying with the viscosity of said servo damping fluid,
(h) force sensing means operatively connected to said first servo member, and
(i) servo means operatively associated with said drag members for varying said first drag area in response to said force sensing means to decrease said first drag area responsive to an increase of the viscous drag force on said first servo member and to increase said first drag area responsive to a decrease in the viscous drag force on said first servo member, whereby the drag force on said movable member is kept constant.

6. The device of claim 5 in which said servo damping fluid is the same as said damping fluid in said first drag area, and in which said first and second drag areas are in substantially the same temperature environment.

7. In an instrument, a damper for damping motion of a movable member with respect to a reference portion and comprising:
(a) a first drag member secured to and movable with said movable member and having a first drag surface,
(b) a second drag member secured to and stationary relative to said reference portion and having a second drag surface facing toward, and spaced a predetermined distance from, said first drag surface to form a drag area,
(c) damping fluid in said drag area to create a viscous drag between said drag members, and
(d) moving means for moving said drag members relative to one another in a direction other than that of said motion of said movable member so as to vary said drag area, at least one of said drag members having a defining edge portion along that drag surface portion thereof which first begins to come into facing relationship with the other drag member when said drag members are moved toward each other so as to create a drag area, said defining edge portion being so contoured that as said drag members are moved relative to one another by said drag member moving means to vary the drag area, an increment of change in the viscosity of said damping fluid is, in relation to the immediately previous level of viscosity, proportional to the corresponding increment of change in the drag area in relation to the immediately previous amount of drag area, an increment of increase in viscosity occurring with an increment of decrease in drag area, and an increment of decrease in viscosity occurring with an increment of increase in drag area.

8. In an instrument, a damper for damping motion of a movable member with respect to a reference portion and comprising:
(a) a first drag member secured to and movable with said movable member and having a first set of drag surfaces,
(b) a second drag member secured to and stationary relative to said reference portion and having a second set of drag surfaces facing toward, and spaced a pretermined distance from, said first set of drag surfaces to form a drag area,
(c) damping fluid in said drag area to create a viscous drag between said drag members, and
(d) moving means for moving said drag members relative to one another so as to vary said drag area, some of the surfaces of one of said sets of drag surfaces being so arranged that as said drag members are moved relative to one another so as to increase said drag area, some of said drag surfaces of one said set begin to come into facing relationship with their related surfaces of the other said set, said sets thus being so arranged that the change of drag area is inversely proportional to the change in viscosity of the damping fluid.

References Cited by the Examiner

UNITED STATES PATENTS

| | | | |
|---|---|---|---|
| 1,228,215 | 5/17 | Junkers | 188—90 |
| 1,309,409 | 7/19 | Henderson | 74—5.5 |
| 2,667,078 | 1/54 | Baecher | 74—5.5 |
| 2,768,798 | 10/56 | Johnston | 188—90 |
| 2,955,471 | 10/60 | Schwartz | 188—100 |
| 2,959,252 | 11/60 | Jamieson | 73—497 |
| 2,998,868 | 9/61 | Meier | 188—100 |

FOREIGN PATENTS 22,494   10/06   Great Britain.

RICHARD C. QUEISSER, *Primary Examiner.*
ROBERT L. EVANS, JAMES J. GILL, *Examiners.*